(12) United States Patent  
Newman et al.

(10) Patent No.: US 7,670,484 B2
(45) Date of Patent: Mar. 2, 2010

(54) FILTER CARTRIDGE CONSTRUCTION WITH CARBON PROFILE

(75) Inventors: Daniel A. Newman, Salem, VA (US); Donald Barry Huehn, Blacksburg, VA (US)

(73) Assignee: Tetra Holding (US), Inc., Blacksburg, VA (US)

( * ) Notice: Subject to any disclaimer, the term of this patent is extended or adjusted under 35 U.S.C. 154(b) by 157 days.

(21) Appl. No.: 11/893,385

(22) Filed: Aug. 15, 2007

(65) Prior Publication Data

US 2009/0045113 A1  Feb. 19, 2009

(51) Int. Cl.
- *A01K 63/04* (2006.01)
- *C02F 3/04* (2006.01)
- *B01D 24/00* (2006.01)

(52) U.S. Cl. .............. 210/167.22; 210/167.25; 210/167.27; 210/151; 119/260

(58) Field of Classification Search .......... 210/150, 210/151, 167.22, 167.25, 167.27, 282, 416.2; 119/259, 260

See application file for complete search history.

(56) References Cited

U.S. PATENT DOCUMENTS

| | | | |
|---|---|---|---|
| 3,983,843 A | 10/1976 | Johnson | |
| 4,711,718 A * | 12/1987 | Nelson, Jr. | 210/282 |
| 4,714,547 A * | 12/1987 | Willinger | 210/167.22 |
| D307,626 S | 5/1990 | Willinger | |
| 5,053,125 A | 10/1991 | Willinger et al. | |
| D353,649 S | 12/1994 | Willinger et al. | |
| 5,618,419 A | 4/1997 | Fuerst | |
| 6,387,260 B1 * | 5/2002 | Pimenov et al. | 210/282 |
| 6,692,637 B2 | 2/2004 | Fox et al. | |
| 6,843,909 B1 | 1/2005 | Woltmann | |
| 7,060,181 B2 * | 6/2006 | Fox et al. | 210/167.22 |
| 2007/0175817 A1 | 8/2007 | Goldman | |
| 2009/0045111 A1 | 2/2009 | Huehn | |
| 2009/0045112 A1 | 2/2009 | Huehn et al. | |
| 2009/0045114 A1 | 2/2009 | Huehn et al. | |

OTHER PUBLICATIONS

Color photo copies of Ginger Filter Cartridge (also submitted in black and white as Exhibit B below); 1 pg.; Date: Admitted as Prior Art.
Black and White photo copies of Ginger Filter Cartridge (also submitted in color as Exhibit A above); 1 pg.; Date: Admitted as Prior Art.
Huehn et al.; U.S. Appl. No. 11/645,225; "Filter Cartridge"; 24 pgs.; filed Dec. 22, 2006.
Imagine® Bio 3 Disposable Filter Cartridges; 3 pgs. Date: Admitted Prior Art.

* cited by examiner

*Primary Examiner*—Fred Prince
(74) *Attorney, Agent, or Firm*—Merchant & Gould P.C.

(57) ABSTRACT

A filter cartridge including a filtering body having first and second porous filter walls. The second porous filter wall having a density that is different than the first porous filter wall. The density of the second porous filter wall being defined by interstitial spaces. The filter cartridge further including discrete chemically filtering particles that are captured within the interstitial spaces of the second porous filter wall when the filtering body is in a vertical filtering orientation.

24 Claims, 7 Drawing Sheets

US 7,670,484 B2

FILTER CARTRIDGE CONSTRUCTION WITH CARBON PROFILE

FIELD OF THE INVENTION

The present disclosure relates generally to devices for use in the aquatics industry, and various methods associated with such devices. More particularly, this disclosure relates to a filter cartridge for use in filtering aquarium water.

BACKGROUND OF THE INVENTION

To maintain an ecological balance within an aquarium, it is necessary to clean the aquarium water. Cleaning is often accomplished by pumping water from the aquarium to a filter housing. In the filter housing, the water is mechanically filtered through a filter element and then returned to the aquarium. Some filter elements further provide chemical filtration to filter chemicals and organics that can build up in the aquarium water.

In one chemical filtration arrangement, charcoal pellets are deposited into a central volume of a filter element or bag. The charcoal pellets settle at the bottom of the bag during filtration use. A significant portion of water can bypass the settled charcoal pellets and therefore not obtain the benefit of the chemical filtration.

In another chemical filtration arrangement, carbon is bonded to a carbon carrier or carbon layer, which is in turn secured to the filter element. The bonding process in the manufacture of the carbon carrier, however, often occludes or obstructs the surface area of the carbon, reducing the carbon's capacity to capture organics in the water.

In yet other chemical filtration arrangements, carbon is distributed over portions of the face area of a filter element by use of shelf-like features formed in injection molded shells, or by the use of pockets sewn into the filter element. The shelf-like features and pockets compartmentalize the carbon so that the carbon is distributed across the face area of the filter element. Manufacture of such shell structures and pocketed filter elements is expensive and adds significant costs to the making of filter elements.

In general, filter devices and arrangements used for filtering aquarium water can be improved.

SUMMARY OF THE INVENTION

The present disclosure relates to a filter cartridge for use in an aquarium filter. The cartridge includes a filter element having chemically filtering media. The chemically filtering media is defined by a plurality of discrete particles located within the interior of the filter element. A majority of the discrete particles is captured within interstitial spaces of a porous filter wall of the element.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
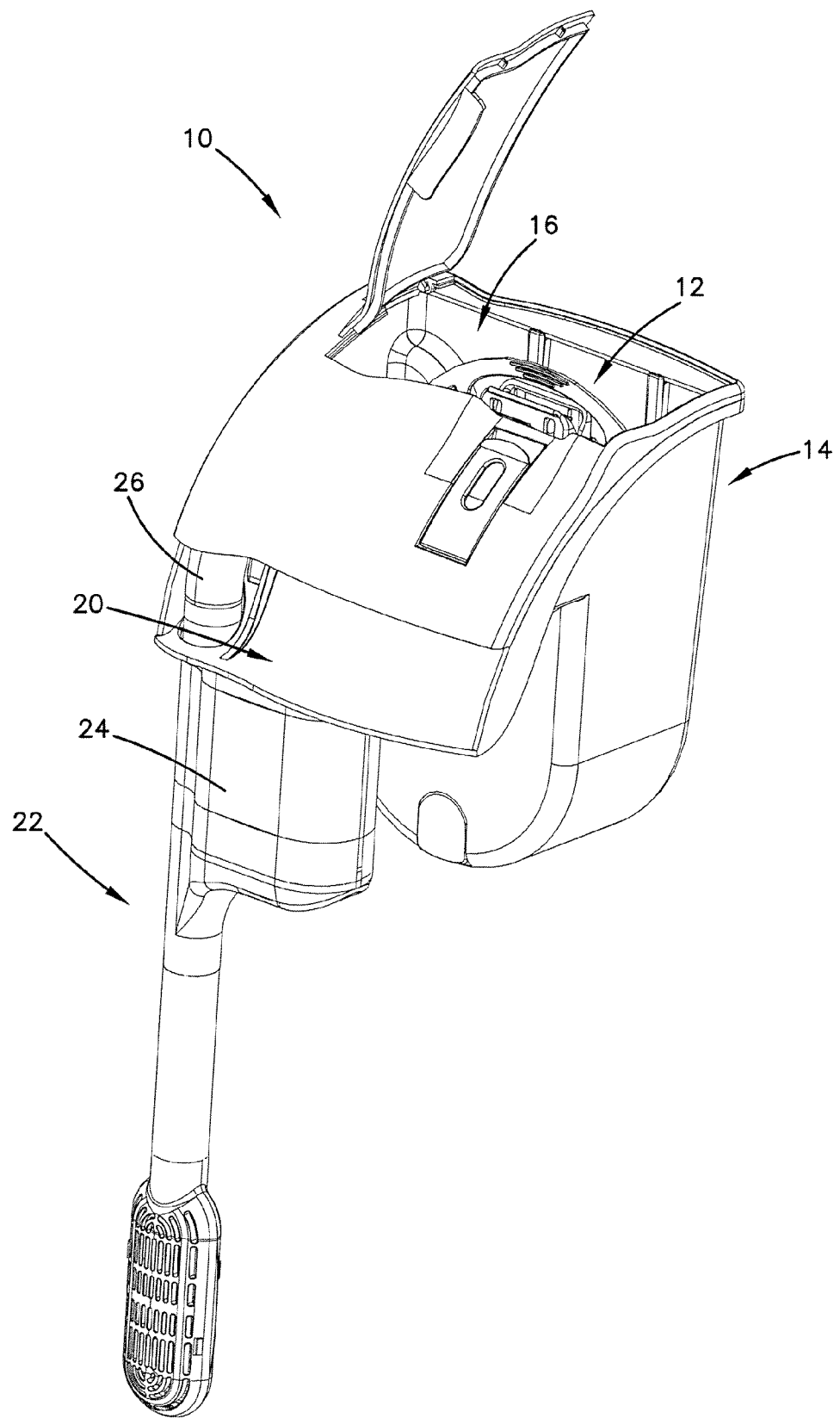
FIG. 1 is front perspective view of an aquarium filter utilizing a filter cartridge constructed in accordance with the principles disclosed.

FIG. 1 illustrates an aquarium filter 10 including a filter cartridge 12 having features in accordance with the principles disclosed. The filter 10 is designed for use in an aquarium; however, the features of the present filter cartridge 12 can be used in filters designed for other aquatic applications, such as in pond applications, for example.

As will be described in greater detail hereinafter, the present filter cartridge is designed to provide improved chemical filtration. For instance, in one aspect, the disclosed filter cartridge 12 has a chemically filtering profile that reduces the volume of water bypassing the chemical filtration, and which is provided without added manufacturing costs associated with compartmentalizing chemically filtering media.

Figure 2:
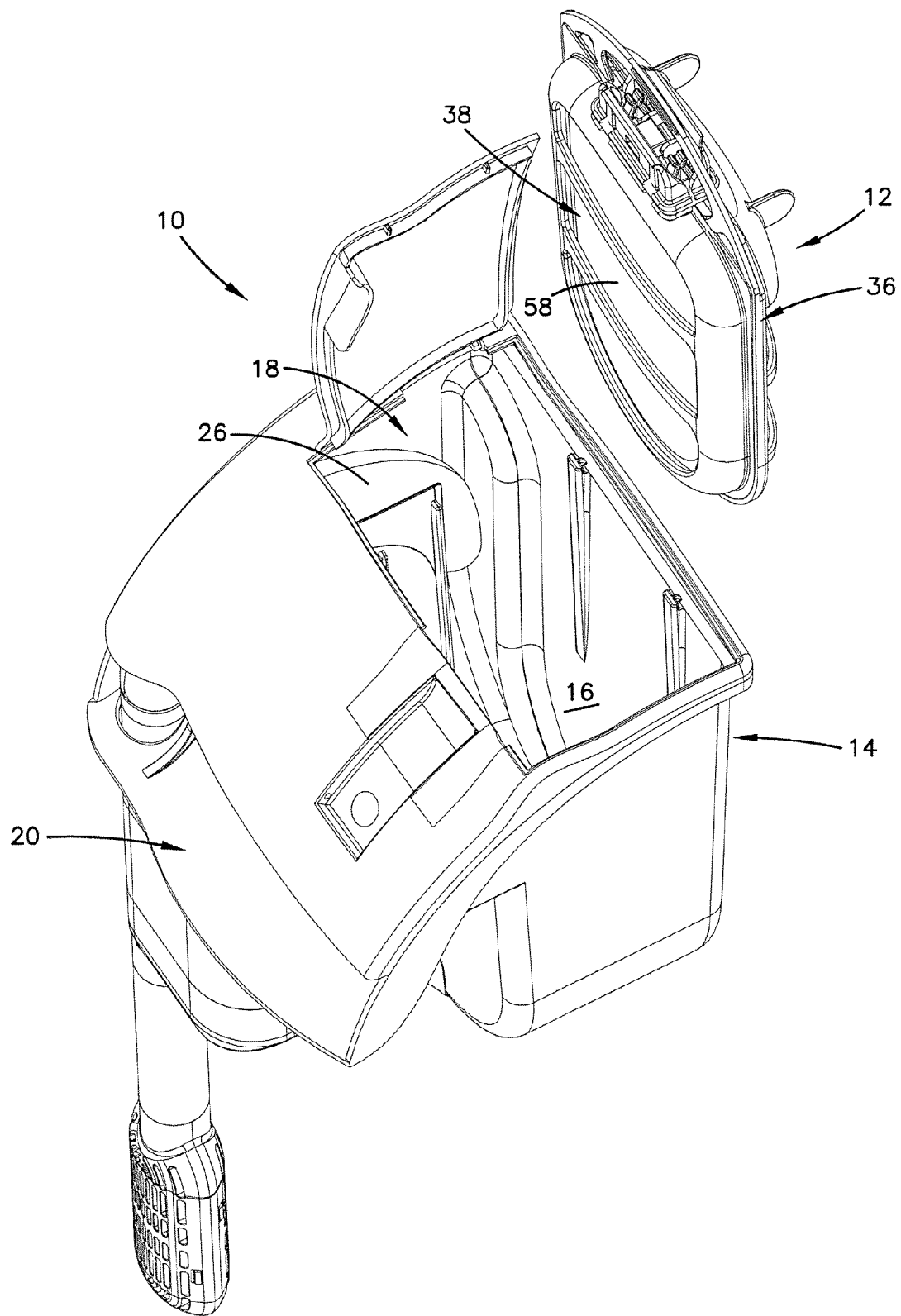
FIG. 2 is a top perspective view of the aquarium filter of FIG. 1, illustrating the insertion orientation of the filter cartridge.

Referring to FIGS. 1 and 2, the aquarium filter 10 generally includes a filter housing 14 having an interior filtering chamber 16. During filtration, the filter cartridge 12 is located within the interior filtering chamber 16. Further details of a filter housing that can be used with the present filter cartridge 12 are described in U.S. patent application Ser. No. 11/893,367.

The filter housing 14 generally includes an input 18 (partly shown in FIG. 2) and an output 20. Water is drawn or directed from the aquarium into the filtering chamber 16 through the housing input 18. In particular, the aquarium filter 10 includes an intake assembly 22 (FIG. 1) that is in fluid communication with the housing input 18. The intake assembly 22 includes a motor (not shown) contained within a motor housing 24. The motor draws water from the aquarium through an intake tube 26 that directs the water into the input 18; the input 18 in turn directing the water into the filtering chamber 16 of the filter housing 14.

Figure 3:
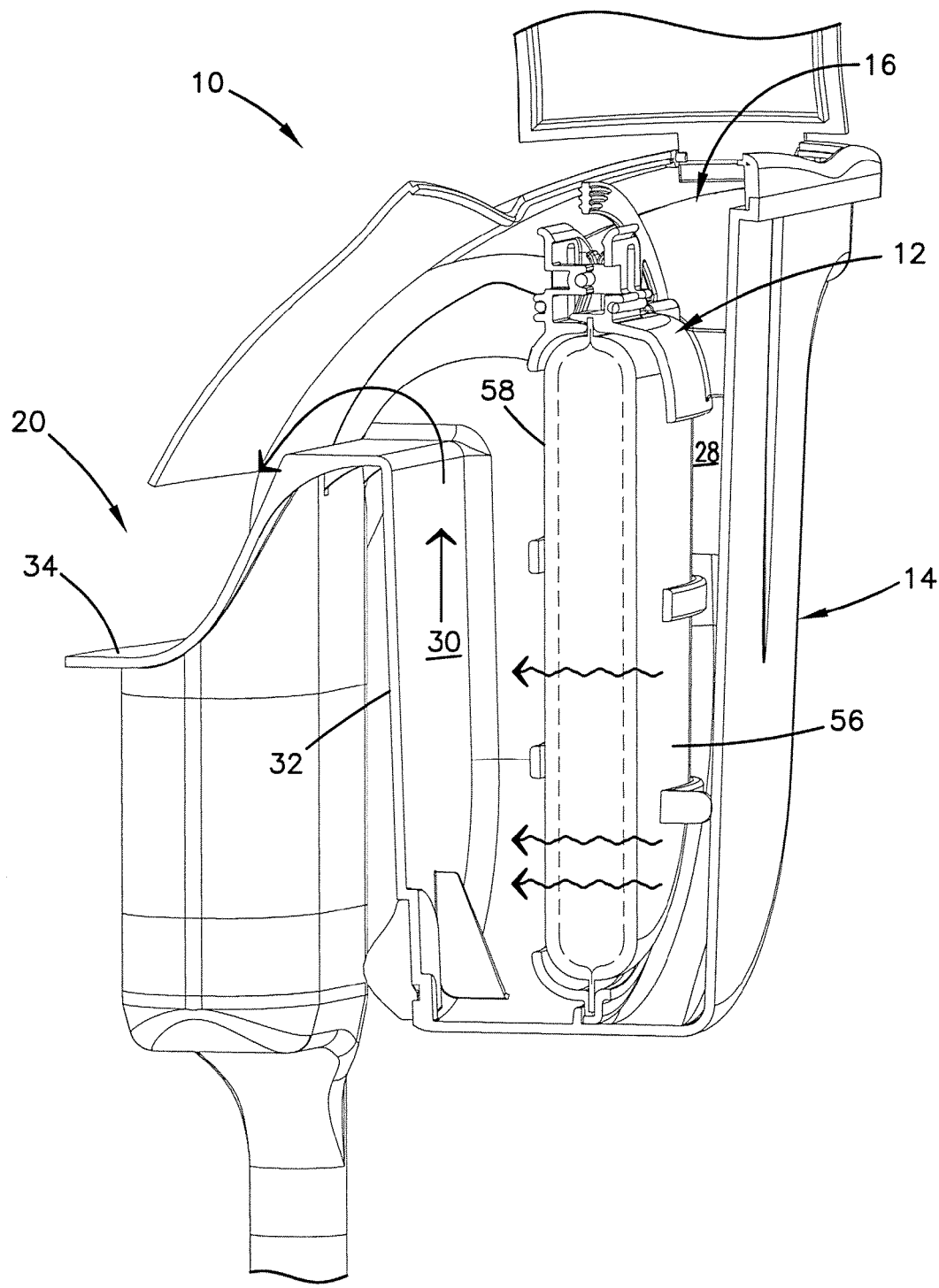
FIG. 3 is a cross-sectional side perspective view of the aquarium filter of FIG. 1.

Referring now to FIG. 3, when the filter cartridge 12 is positioned within the filtering chamber 16, the filter cartridge 12 divides the filtering chamber 16 into an upstream, unfiltered water chamber side 28 and a downstream, filtered water chamber side 30. The upstream, unfiltered water chamber side 28 is located rearward of the downstream, filtered water chamber side 30 in the housing 14. In use, water flows by gravity from the rearward unfiltered water chamber side 28 through the filter cartridge 12 to the forward filtered water chamber side 30.

From the downstream filtered water chamber side 30, the filtered water is returned to the aquarium by way of the housing output 20. In particular, the water rises within the filtered water chamber side 30 until it exits over a front wall 32 of the filter housing 14 (see arrows). In the illustrated embodiment, the output 20 includes a spillway lip 34 formed in the front wall 32 of the housing 14.

Figure 4:
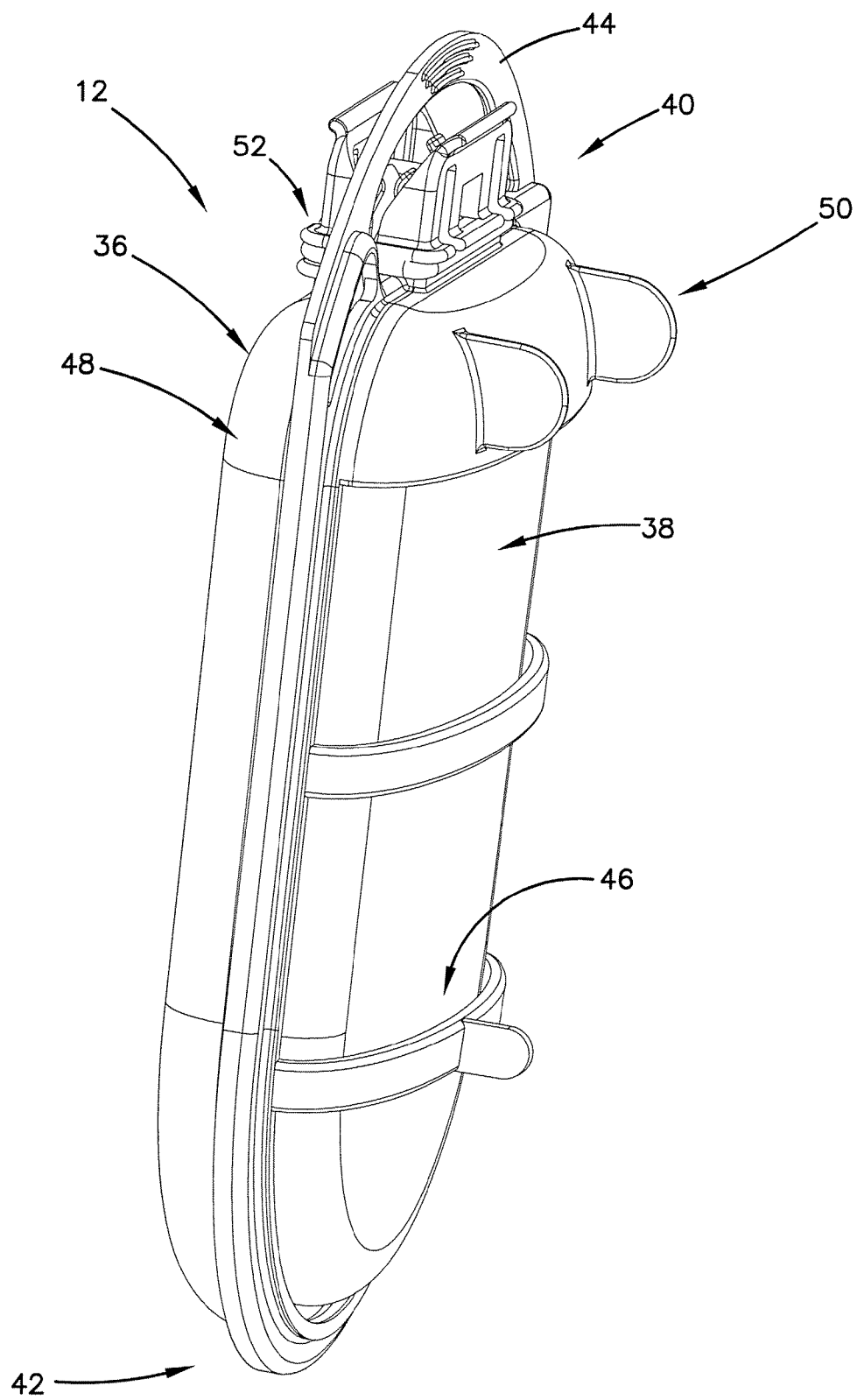
FIG. 4 is a rear perspective view of the filter cartridge of FIG. 2.
Figure 5:
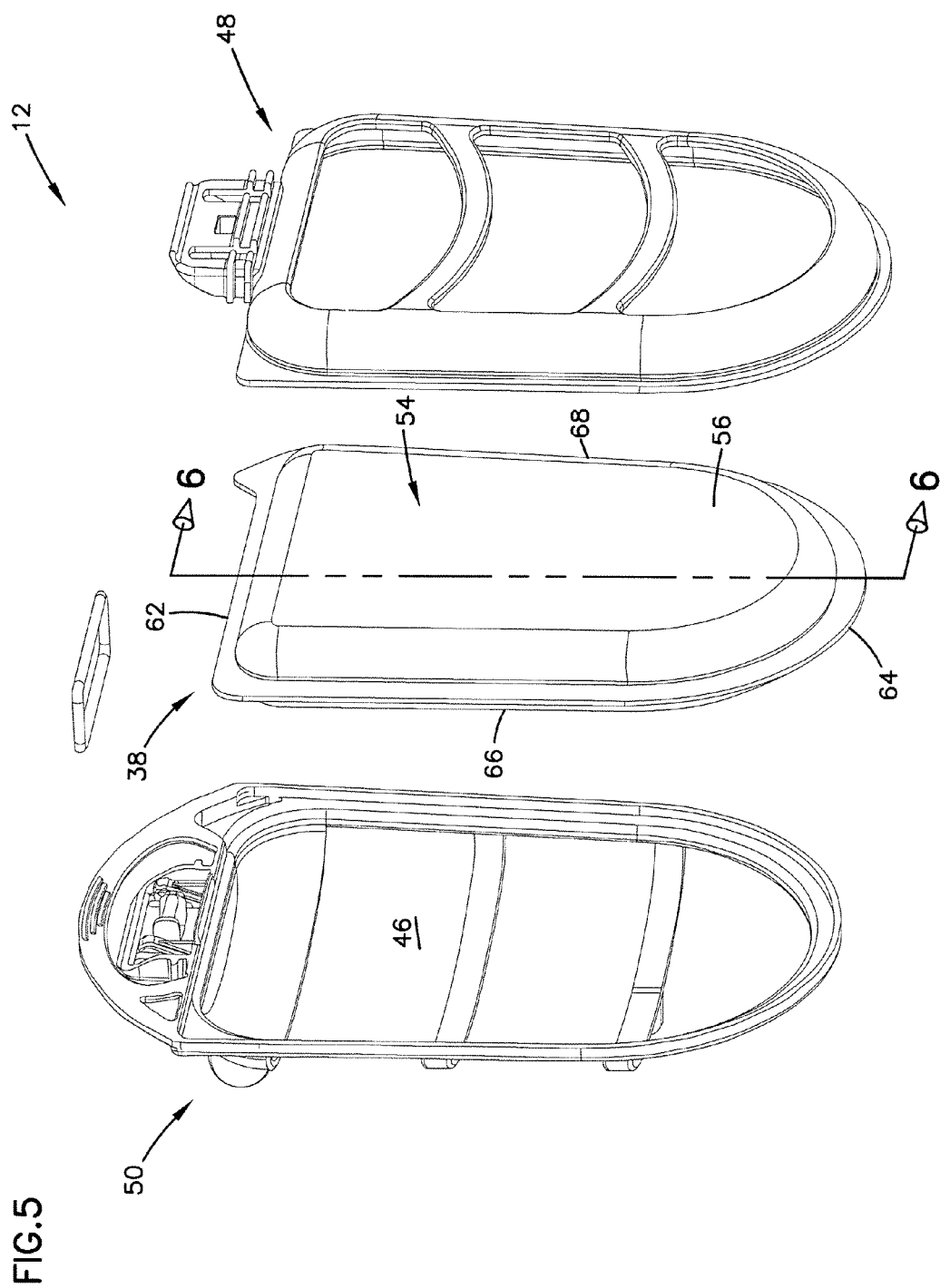
FIG. 5 is an exploded front perspective view of the filter cartridge of FIG. 4.

Referring now to FIGS. 4 and 5, the filter cartridge 12 of the present disclosure generally includes a carrier 36 (e.g., a cartridge carrier, filter carrier, or support frame) and a filter element 38 (e.g., filter media or filter cartridge) secured in relation to the carrier 36. The carrier 36 has a first end 40 and an opposite second end 42. A handle 44 is located adjacent to the first end 40 of the carrier 36. The handle 44 is used to maneuver the cartridge 12 when installing or removing the cartridge from the aquarium filter 10. The handle 44 can also be used to carry or transport the cartridge 12 to a disposal container or sink for service. In an alternative embodiment, the filter element 38 can be treated with a stiffening agent such that the filter element can structurally support itself without use of a carrier or support frame (e.g., the filter cartridge can include only the filter element).

In the illustrated embodiment, the filter element 38 of the cartridge 12 is positioned within an interior region 46 of the carrier 36. Referring to FIG. 5, the carrier 36 has a first front frame member 48 and a second rear frame member 50 that define the interior region 46. The first and second frame members 48, 50 are attached to one another at a hinged connection 52 (FIG. 4). The hinged connection 52 permits a user to open and close the carrier (i.e., pivot or hinge the members 48, 50 relative to one another). In the open position, the interior region 46 of the carrier 36 is accessible for removing or inserting the filter cartridge 12. In the closed position, the filter cartridge 12 is contained within the interior region 46. Further details of an example carrier that can be used in the present filter cartridge 12 are described in U.S. patent application Ser. Nos. 11/893,359 and 11/893,383; which applications are incorporated herein by reference.

Figure 6:
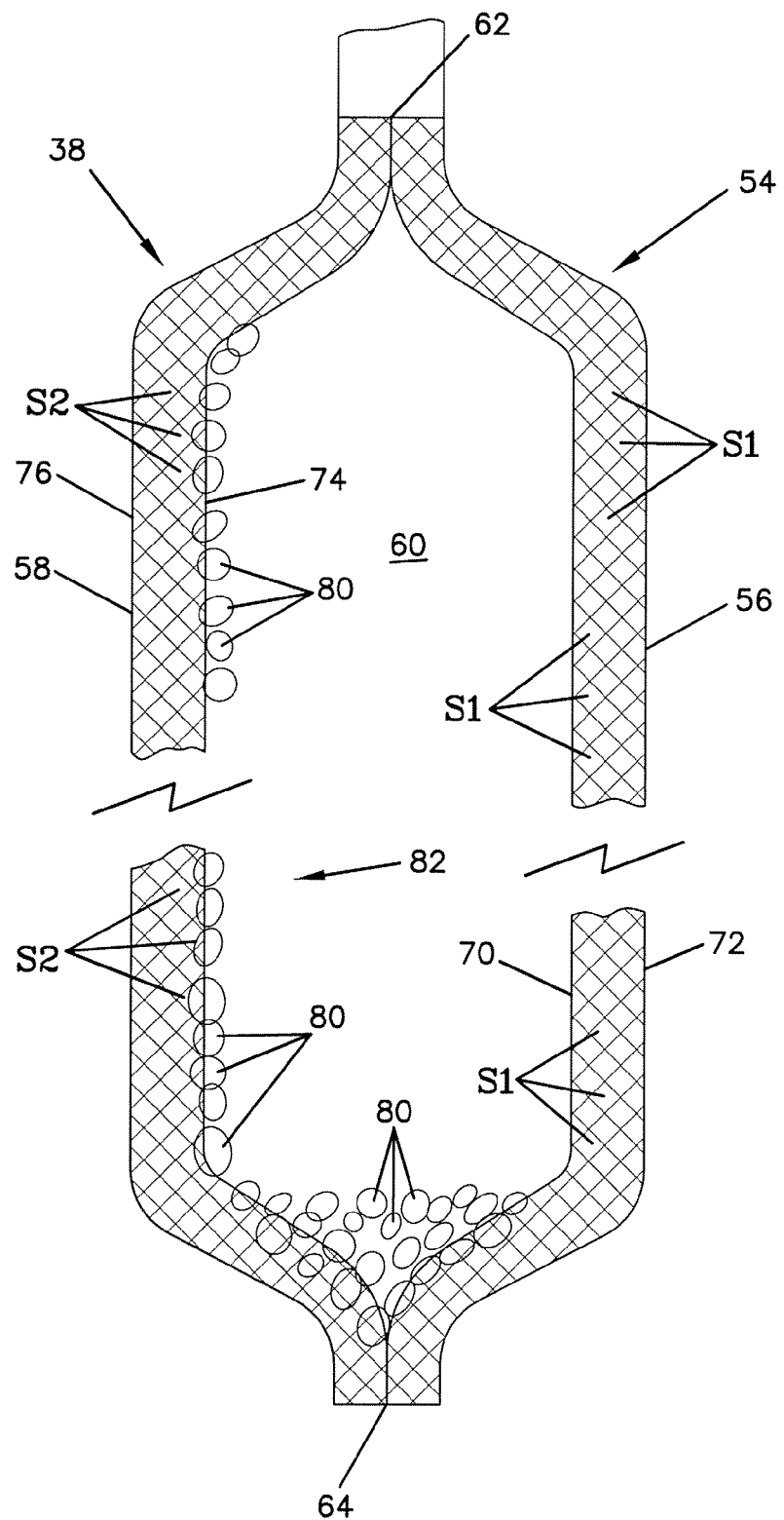
FIG. 6 is a cross-sectional, schematic representation of a filter element embodiment of the filter cartridge of FIG. 5, taken along line 6-6.

Referring now to FIGS. 5 and 6, the filter element 38 of the present filter cartridge 12 includes a filtering body 54 defined by a first porous filter wall 56 and a second opposing, porous filter wall 58. The first and second porous filter walls 56, 58 are joined to one another along only a top seam 62, a bottom seam 64 and side seams 66, 68 that define the perimeter of the filtering body 54. The joined walls 56, 58 define an interior region or chamber 60 of the filtering body 54.

As schematically illustrated in FIG. 6, the first porous filter wall 56 has a first density defined by interstitial spaces S1 formed or located between inner and outer sides 70, 72 of the first porous filter wall 56. The second porous filter wall 58 has a second density defined by interstitial spaces S2 formed or located between inner and outer sides 74, 76 of the second porous filter wall 58. The first density of the first porous filter wall 56 is different than the second density of the second porous filter wall 58.

The interstitial spaces S1 of the first porous filter wall 56 are sized to provide mechanical filtration of the aquarium water. Mechanical filtration is the physical capture of particulates suspended in the water flow. In use, as is illustrated in FIGS. 2 and 3, the first porous filter wall 56 is typically located toward the upstream water chamber side 28 of the filtering chamber 16. Water entering the filter cartridge 12 first passes through the first porous filter wall 56. The size of the interstitial spaces S1 of the first porous filter wall 56 physically captures or entraps aquarium water particulates.

The interstitial spaces S2 of the second porous filter wall 58 define a looser density or a density that is less than the density of the first porous filter wall 56. The less-dense second porous filter wall 58 of the filtering body functions in part to provide mechanical filtration, and further, in part, to facilitate chemical filtration.

In particular, the present filter cartridge 12 is designed to both mechanically filter and chemically filter aquarium water. Chemical filtration is accomplished by the provision of chemically filtering media 80, such as charcoal or carbon, for example. Other types of chemically filtering media can be used in accordance with the principles disclosed, such as granulated zeolite or other ion exchange resins or porous minerals.

The chemically filtering media 80 includes a plurality of particles located within the interior chamber 60 of the filtering body 54. What is meant by "particles" is that the media is in the form of discrete particles (i.e., granulates or pellets), as opposed to a substrate coated with powdered carbon, a carbon film or a bonded carbon layer. In the illustrated embodiment, the particles 80 have a 6 through 14 sieve mesh size (US standard sieve mesh size). Further, in one embodiment the discrete particles are carbon particles 80 having a sieve mesh size of 6 through 14. While the remaining disclosure refers to the particles as "carbon" particles, it is to be understood that the particles can include other types of discrete chemically filtering particles as previously described.

The carbon particles 80 are distributed along the inner side 74 of the second porous filter wall 58 when the filter cartridge is in a vertical filtering orientation. The distribution may be a random distribution, or a distribution that is more uniform between the top and bottom seams 62, 64 of the filter cartridge. In the vertical orientation, the distribution of the carbon particles 80 defines a chemically filtering face 82 (such as a carbon face) that eliminates water by-pass problems associated with arrangements having charcoal deposits located only at the bottom of a filter element. Instead, the present filter cartridge 12 has a forward carbon profile (i.e., the carbon face 82) through which all water flow passes to effectively provide chemical filtration.

Referring still to FIG. 6, the distribution of the carbon particles 80 is maintained by the density of the second porous filter wall 58. More specifically, the carbon particles 80 are captured within the interstitial spaces S2 of the second porous filter wall 58. The less-dense material (such as low-density floss) of the second porous filter wall 58 is selected to correspond to the particular size of the discrete carbon particles to accommodate the capture of the carbon, and to retain the carbon when the filter cartridge 12 is vertically oriented. Desirably, a majority of the discrete particles 80 located within the interior chamber 60 of the filtering body 54 is captured and distributed across the face area of the second porous filter wall 58 when the filtering body is in the vertical filtering orientation. In one embodiment, the captured carbon particles 80 are distributed and retained across a substantial majority of the face area of the second porous filter wall 58; the area of the carbon face 82 of the present filtering body 54 extending substantially between the top and bottom seams 62, 64 of the filtering body 54.

The disclosed filter cartridge arrangement has many advantages. In one aspect, the capture of discrete carbon particles along the face area of the filtering body eliminates the need to provide costly pocketed walls or compartmental-type structures. In another aspect, the capture of discrete carbon particles along the face area increases the effective chemical filtration, while reducing the volume or amount of carbon particles necessary for such effect. For example, the entire volume of the interior chamber 60 need not be filled with carbon particles in the present cartridge to provide a forward carbon profile that extends substantially between the top and bottom seams 62, 64. Rather, the present arrangement utilizes a lesser amount of carbon particles that is distributed and retained along the forward profile of the cartridge. Also, in yet another aspect, use of discrete carbon particles eliminates many of the problems often associated with carbon films or layers, such as bonding occlusion, for example.

In use, as is illustrated in FIGS. 2 and 3, the second porous filter wall 58 is typically located toward the downstream water chamber side 30 of the filtering chamber 16. As previously described, an amount of carbon particles 80 is captured within the interstitial spaces S2 of the second porous filter wall 58. Desirably, the amount captured is greater than any additional non-captured amount (e.g., any extra deposited amount that may settle in the bottom of the filter element 38). Water entering the filter cartridge 12 is first mechanically filtered by passing through the first porous filter wall 56. The water is then chemically filtered by passing through the second porous filter wall 58, including the chemically filtering face 82 defined by the distribution of a majority of the carbon particles 80 along the second porous filter wall 58.

Figure 7:
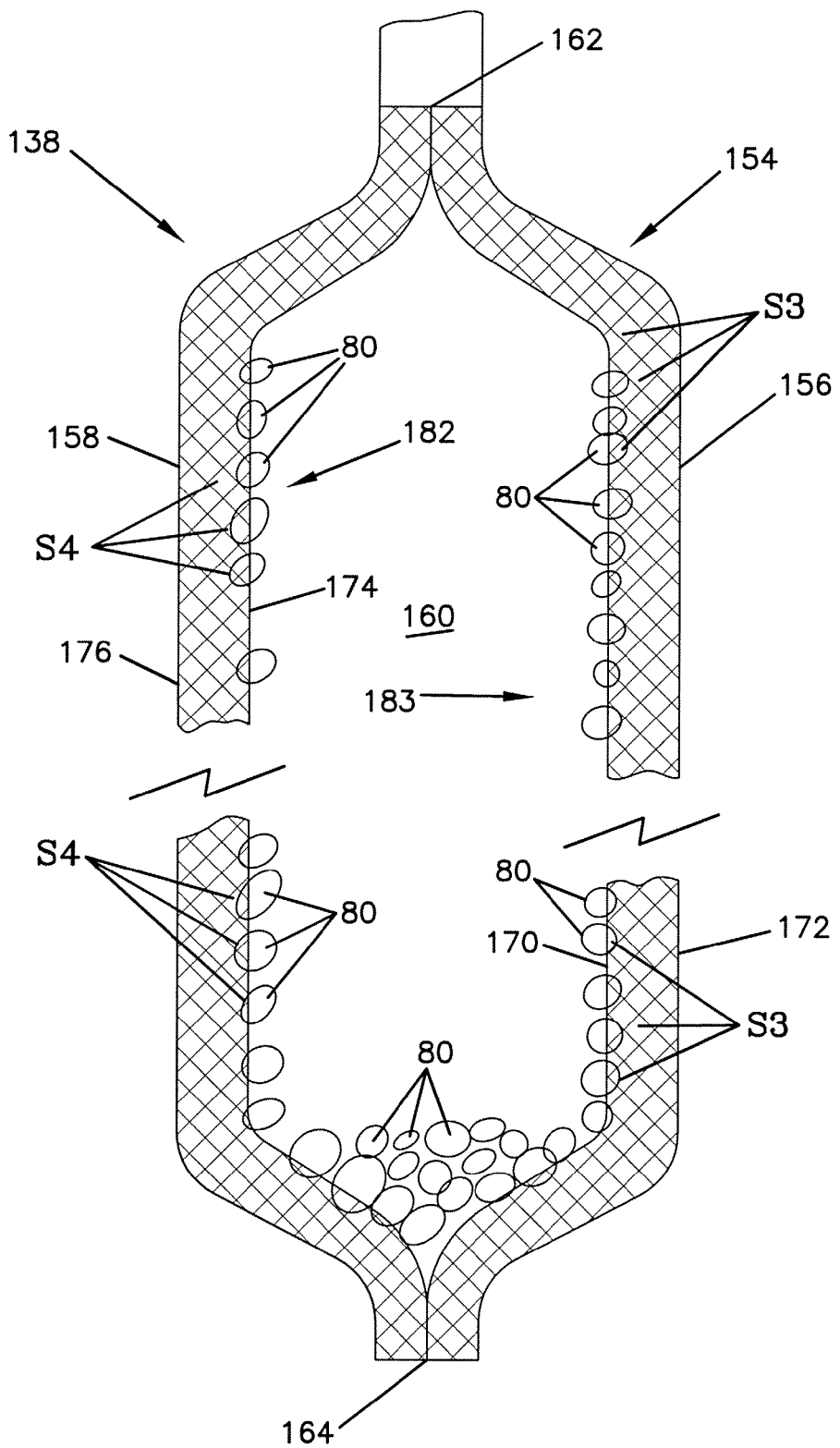
FIG. 7 is a cross-sectional, schematic representation of another filter element embodiment constructed in accordance with the principles disclosed.

Referring now to FIG. 7, a second embodiment of a filter element 138 is illustrated. The filter element 138 can be used as part of a filter cartridge (e.g., 12; FIG. 4) having a carrier 36 as previously described. Similar to the previous embodiment, the filter element 138 of FIG. 7 includes a filtering body 154 defined by a first porous filter wall 156 and a second opposing, porous filter wall 158. The first and second porous filter walls 156, 158 are joined to one another along only a top seam 162, a bottom seam 164 and side seams (not shown) that define the perimeter of the filtering body 154. The joined walls 156, 158 define an interior region or chamber 160 of the filtering body 154.

As schematically illustrated in FIG. 7, the first porous filter wall 156 has a first density defined by interstitial spaces S3 formed or located between inner and outer sides 170, 172 of the first porous filter wall 156. The second porous filter wall 158 has a second density defined by interstitial spaces S4 formed or located between inner and outer sides 174, 176 of the second porous filter wall 158. In this embodiment, the first density of the first porous filter wall 156 can be substantially the same as the second density of the second porous filter wall 158.

In particular, the interstitial spaces S3, S4 of both the first and second porous filter walls 156, 158 are sized to provide mechanical filtration, and further, in part, to facilitate chemical filtration. That is, each of the first and second porous filter walls 156, 158 is constructed to capture and retain the chemically filtering media 80 (e.g., discrete carbon particles) when the filter cartridge is in the vertical filtering orientation. In the illustrated embodiment, the material (such as low-density floss) of the first and second porous filter walls 156, 158 is selected to correspond to the particular size of the discrete particles 80 to accommodate the capture of the particles and to retain the particles when the filtering body 154 is vertically oriented. Desirably, a majority of the discrete particles 80 located within the interior chamber 160 of the filtering body 154 is captured and distributed across the face areas (i.e., inner sides 170, 174) of the first and second porous filter walls 156, 158 when the filtering body 154 is in the vertical filtering orientation.

As previously described, the distribution of the discrete particles 80 may be a random distribution, or a distribution that is more uniform between the top and bottom seams 162, 164 of the filtering body 154. In the vertical orientation, the distribution of the carbon particles 80 defines chemically filtering faces 182, 183 (such as carbon faces) that eliminate water by-pass problems associated with arrangements having charcoal deposits located only at the bottom of a filter element.

In use, the first porous filter wall 156 is typically located toward the upstream water chamber side 28 (FIG. 3) of the filtering chamber 16 while the second porous filter wall 158 is located toward the downstream water chamber side 30. Water entering the filter cartridge is mechanically and chemically filtered by passing through the first porous filter wall 156, and again mechanically and chemically filtered by passing through the second porous filter wall 158.

The above specification provides a complete description of the present invention. Since many embodiments of the invention can be made without departing from the spirit and scope of the invention, certain aspects of the invention reside in the claims hereinafter appended.

What is claimed is:

1. A filter cartridge for use in an aquarium filter, the filter cartridge comprising:
    a) a filtering body defining a non-pocketed interior volume, the filtering body including:
        i) a first porous filter wall having a first density; and
        ii) a second porous filter wall having a second density, the second density being defined by interstitial spaces between inner and outer sides of the second porous filter wall; and
    b) chemically filtering media located within the non-pocketed interior volume of the filtering body, the chemically filtering media being in the form of a plurality of discrete particles, the plurality of discrete particles defining a media volume significantly less than that of the interior volume, the discrete particles having a sieve mesh size of 6 through 14;
    c) wherein a majority of the discrete particles is captured within the interstitial spaces of the second porous filter wall when the filtering body is in a vertical filtering orientation such that the discrete particles are distributed and retained across a majority of a downstream face area of the filter body.

2. The cartridge of claim 1, further including a carrier, the filtering body being secured relative to the carrier.

3. The cartridge of claim 2, wherein the filtering body is located within an interior region defined by first and second frame members of the carrier.

4. The cartridge of claim 3, wherein the first and second frame members are interconnected at a hinged connection, the hinged connection providing access to the filtering body located within the interior region.

5. The cartridge of claim 1, wherein the first density of the first porous filter wall is defined by interstitial spaces between inner and outer sides of the first porous filter wall, the interstitial spaces of the first porous filter wall being sized to provide mechanical filtration.

6. The cartridge of claim 5, wherein the interstitial spaces of the second porous filter wall are sized to provide mechanical filtration and to facilitate the capture of the majority of discrete particles to further provide chemical filtration.

7. The cartridge of claim 1, wherein the first and second porous walls are joined along a top seam, a bottom seam, and side seams that define the perimeter of the filtering body, the captured discrete particles being carbon particles that define a carbon face extending substantially between the top and bottom seams of the filtering body when the filtering body is in the vertical filtering orientation.

8. The cartridge of claim 1, wherein the chemically filtering media includes a plurality of discrete carbon particles.

9. A filter cartridge for use in an aquarium filter, the filter cartridge comprising:
   a) a support frame;
   b) a filtering body secured to the support frame, the filtering body defining a non-pocketed interior, the filtering body including:
      i) a first porous filter wall having a first density; and
      ii) a second porous filter wall having a second density, the first and second porous filter walls being joined to one another only along a perimeter of the filtering body; and
   c) chemically filtering media located within the interior of the filtering body, the chemically filtering media including a plurality of discrete particles, a majority of the discrete particles being captured across a majority of a face area of the second porous filter wall when the filter cartridge is in a generally vertical orientation, the face area extending between a top and a bottom of the filtering body.

10. The cartridge of claim 9, wherein the filtering body is located within an interior region defined by first and second frame members of the support frame.

11. The cartridge of claim 10, wherein the first and second frame members are interconnected at a hinged connection, the hinged connection providing access to the filtering body located within the interior region.

12. The cartridge of claim 9, wherein the discrete particles have a sieve mesh size of 6 through 14.

13. The cartridge of claim 9, wherein the second density of the second porous filter wall is different than the first density of the first porous filter wall, the second density being defined by interstitial spaces between inner and outer sides of the second porous filter wall.

14. The cartridge of claim 13, wherein the interstitial spaces are sized to provide mechanical filtration and facilitate the capture of the majority of discrete particles to further provide chemical filtration.

15. The cartridge of claim 14, wherein the first density of the first porous filter wall is defined by interstitial spaces between inner and outer sides of the first porous filter wall, the interstitial spaces of the first porous filter wall being sized to provide mechanical filtration.

16. The cartridge of claim 9, wherein the chemically filtering media includes a plurality of discrete carbon particles.

17. An aquarium filter arrangement, comprising:
   a) a filter housing defining a filtering chamber; and
   b) a filter cartridge positioned within the filtering chamber, the filter cartridge dividing the filtering chamber into an upstream filter chamber side and a downstream filter chamber side, wherein aquarium water flows from the upstream filter chamber side to the downstream filter chamber side in a generally horizontal direction, the filter cartridge including:
      i) a filtering body defining a non-pocketed interior, the filtering body including a first porous filter wall having a first density that provides mechanical filtration, and a second porous filter wall having a second density, the second density being defined by interstitial spaces between inner and outer sides of the second porous filter wall; and
      ii) a plurality of discrete carbon particles located within the interior of the filtering body, the discrete carbon particles having a sieve mesh size of 6 through 14;
      iii) wherein a majority of the carbon particles is captured within the interstitial spaces of the second porous filter wall, the captured carbon particles defining a carbon face;
   c) wherein the first porous filter wall is located adjacent to the upstream filter chamber side of the filtering chamber and the second porous filter wall is located adjacent to the downstream filter chamber side of the filtering chamber.

18. The arrangement of claim 17, wherein the filter cartridge further includes a carrier, the filtering body being secured relative to the carrier.

19. The arrangement of claim 18, wherein the filtering body is located within an interior region defined by first and second frame members of the carrier.

20. The arrangement of claim 19, wherein the first and second frame members are interconnected at a hinged connection, the hinged connection providing access to the filtering body located within the interior region.

21. A filter cartridge for use in an aquarium filter, the filter cartridge comprising:
   a) a filtering body defining a non-pocketed interior volume, the filtering body including a first porous filter wall and a second porous filter wall, each of the first and second porous filter walls including interstitial spaces between inner and outer sides of the porous filter walls; and
   b) chemically filtering media located within the non-pocketed interior volume of the filtering body, the chemically filtering media being in the form of a plurality of discrete particles, the plurality of discrete particles defining a media volume significantly less than that of the interior volume, the discrete particles having a sieve mesh size of 6 through 14;
   c) wherein a majority of the discrete particles is captured within the interstitial spaces of the first and second porous filter walls when the filtering body is in a vertical filtering orientation such that the discrete particles are distributed and retained across the face areas of the first and second porous filter walls.

22. The cartridge of claim 21, further including a carrier, the filtering body being secured relative to the carrier.

23. The cartridge of claim 22, wherein the filtering body is located within an interior region defined by the carrier.

24. The cartridge of claim 21, wherein the chemically filtering media includes a plurality of discrete carbon particles.

* * * * *